(12) United States Patent
Beguinot et al.

(10) Patent No.: US 9,334,552 B2
(45) Date of Patent: May 10, 2016

(54) STEEL FOR SUBMARINE HULLS WITH IMPROVED WELDABILITY

(75) Inventors: Jean Beguinot, Le Creusot (FR); Cédric Chauvy, Saint Firmin (FR)

(73) Assignee: INDUSTEEL FRANCE, Puteaux (FR)

( * ) Notice: Subject to any disclaimer, the term of this patent is extended or adjusted under 35 U.S.C. 154(b) by 102 days.

(21) Appl. No.: 11/915,573

(22) PCT Filed: May 19, 2006

(86) PCT No.: PCT/FR2006/001150
§ 371 (c)(1),
(2), (4) Date: Dec. 10, 2007

(87) PCT Pub. No.: WO2006/125899
PCT Pub. Date: Nov. 30, 2006

(65) Prior Publication Data
US 2008/0213121 A1 Sep. 4, 2008

(30) Foreign Application Priority Data
May 26, 2005 (FR) ..................................... 05 05333

(51) Int. Cl.
*C22C 38/48* (2006.01)
*C22C 38/46* (2006.01)
(Continued)

(52) U.S. Cl.
CPC .................. *C22C 38/02* (2013.01); *C22C 38/04* (2013.01); *C22C 38/08* (2013.01); *C22C 38/12* (2013.01); *C22C 38/42* (2013.01); *C22C 38/44* (2013.01); *C22C 38/46* (2013.01)

(58) Field of Classification Search
None
See application file for complete search history.

(56) References Cited

U.S. PATENT DOCUMENTS 5,523,540 A    6/1996 Coldren et al.
5,650,024 A *  7/1997 Hasegawa et al. ............ 148/326
(Continued)

FOREIGN PATENT DOCUMENTS

EP    0 867 520 A2    9/1998
FR    2 307 879 A    11/1976
(Continued)

OTHER PUBLICATIONS

Submarine Research Bulletin No. 31, http://web.archive.org/web/20040811031648/http://submarineresearch.com/bull31.html, available online Aug. 2004).*
(Continued)

*Primary Examiner* — Yoshitoshi Takeuchi
(74) *Attorney, Agent, or Firm* — Sughrue Mion, PLLC; Richard C. Turner

(57) ABSTRACT

The invention relates to a steel for the production of submarine hulls having the chemical composition:

0.030%≤C<0.080%

0.040%≤Si≤0.48%

0.1%≤Mn≤1.4%

2%≤Ni≤4%

Cr≤0.3%

0.30%≤Mo+W/2+3(V+Nb/2+Ta/4)≤0.89%

Mo≥0.15%

V+Nb/2+Ta/4≤0.004%

Nb≤0.004%

Cu≤0.45%

Al≤0.1%

Ti≤0.04%

N≤0.0300% the balance being iron and impurities resulting from the production operation, boron being an impurity whose content is less than 0.0005%, and P+S≤0.015%, the chemical composition complying with the condition:

$410 \leq 540 \times C^{0.25} + 245[Mo+W/2+3(V+Nb/2+Ta/4)]^{0.30} \leq 460$.

11 Claims, 1 Drawing Sheet

* Data from Examples in the Specification.

(51) Int. Cl.
*C22C 38/44* (2006.01)
*C22C 38/02* (2006.01)
*C22C 38/04* (2006.01)
*C22C 38/08* (2006.01)
*C22C 38/12* (2006.01)
*C22C 38/42* (2006.01)

(56) References Cited

U.S. PATENT DOCUMENTS

| | | | |
|---|---|---|---|
| 6,188,037 B1 | | 2/2001 | Hamada et al. |
| 6,322,642 B1 * | | 11/2001 | Bocquet et al. ............... 148/336 |
| 2002/0179583 A1 * | | 12/2002 | Copeland et al. ..... 219/137 WM |

FOREIGN PATENT DOCUMENTS

| | | | | |
|---|---|---|---|---|
| JP | 2000-129392 A | | 5/2000 | |
| JP | 2001-071176 A | | 3/2001 | |
| JP | 2001-123245 A | | 5/2001 | |
| JP | 2002-212666 | * | 7/2002 | ............. C22C 38/00 |
| WO | 93/24269 A1 | | 12/1993 | |
| WO | 02/12581 A1 | | 2/2002 | |

OTHER PUBLICATIONS

Miller, Solid Wire Verses Flux Cored Wire, http://www.millerwelds.com/resources/articles/Proper-welding-wire-selection.*
Cote et al, Virtual Reality Welder Training, Project Review for ShipTech 2005 (Mar. 1, 2005).*
L. Connor ed., 1-23 Welding Handbook vol. 1, 8th Ed. (1991).*

* cited by examiner

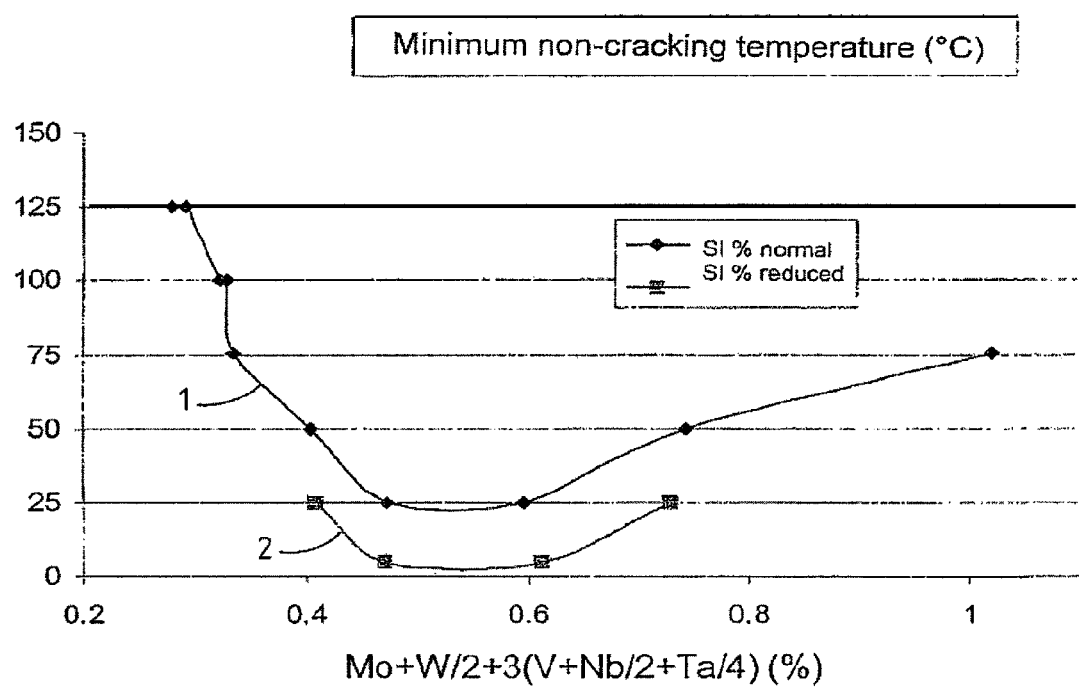
* Data from Examples in the Specification.

STEEL FOR SUBMARINE HULLS WITH IMPROVED WELDABILITY

The present invention relates to a steel for the production of submarine hulls which are constituted by rolled or forged steel components which are assembled by means of welding.

BACKGROUND OF THE INVENTION

In order to be able to immerse in deep water without making the vessel excessively heavy, hulls of submarines are generally constituted by sheets of steel having a thickness of between 40 and 50 mm, and optionally forged components which have a thickness of between 100 and 150 mm and which are constituted by a very high strength steel having a very good impact resistance even at low temperatures, so as to provide a good degree of reliability even in the case of intense dynamic loads, and which can be relatively easily welded so as to allow assemblies of a high quality to be produced.

The steels which are conventionally used are steels of the series referred to as 60 or 80 HLES, whose chemical composition comprises approximately 0.10% of carbon, from 2 to 4% of nickel, from 0.2 to 0.4% of silicon, molybdenum and vanadium at contents such that Mo+3V is between 0.3 and 0.5%, between 0.8 and 1.2% of Mn, between 0.1 and 0.5% of Cr, the balance being iron, impurities and optionally low quantities of deoxidation elements. These steels are used to produce components such as sheets or forged components which are quenched and tempered so as to have a tempered structure which is on the whole martensitic, that is to say, which contains more than 90% of martensite and of which the yield strength is between 550 and 650 MPa, the tensile strength is between 600 and 750 MPa, the elongation at break is between 15 and 20%, the Charpy toughness $K_{cv}$ is greater than 80 J at −80° C.

Components which are produced from these steels are assembled by means of welding with preheating to a temperature in the order of at least 150° C. in order to prevent problems of cracking in the cold state.

These welding conditions are required in particular because the weld seams which are produced are weld seams which are very extensively flanged and which can produce stresses of almost 80% of the elastic limit, and because the weld seams are carried out on sites in which the temperature may drop to a level in the region of 0° C.

The need for carrying out a preheating operation at a high temperature is a disadvantage which makes it difficult to weld components of submarine hulls. Therefore, it is desirable to be able to have a steel which allows weld seams to be produced under less severe conditions, that is to say, without pre-heating, or at least by carrying out only a baking operation of the sheets which does not exceed 100° C., or preferably, 50° C., in spite of the very extensive flanges of the weld seams and in spite of the relatively low outside temperatures of the site.

It has been proposed, in particular in patent application WO93/24269, that the welding conditions be improved for submarine hulls which are produced from a steel of the 60 or 80 HLES type, by using welding electrodes which are different from the electrodes defined by the construction standards which are applied in this field, these welding electrodes leading to low-carbon bainitic structures (LCBS).

However, this technique has disadvantages since the reduction of the risk of cracking which is thus obtained in the region of the deposited metal nonetheless does not overcome the problem of the risk of cracking brought about by the welding operation in the base metal itself, in the region of the heat affected zone.

SUMMARY OF THE INVENTION

The object of the present invention is to overcome these disadvantages by providing a weldable steel with a high yield strength for producing submarine hulls by assembling components, by means of welding, which are constituted by thick sheets or forged components and which have a yield strength of between 480 and 620 MPa, a toughness measured in terms of a Charpy V $K_v$ greater than 50 J at −60° C., preferably greater than 50 J at −85° C., and for which there is a reduction in the risks of occurrences of cracking in the base metal, brought about by a welding operation in the region of the heat affected zone.

BRIEF DESCRIPTION OF THE DRAWINGS

The FIGURE shows "Si % normal" and "Si % reduced" of the Examples set forth in Tables 1 and 2.

DESCRIPTION OF THE INVENTION

To this end, the invention relates to a steel for producing submarine hulls, characterised in that the chemical composition thereof comprises, in % by weight:

$0.030\% \leq C < 0.080\%$ $0.040\% \leq Si \leq 0.48\%$ $0.1\% \leq Mn \leq 1.4\%$ $2\% \leq Ni \leq 4\%$ $Cr \leq 0.3\%$ $0.30\% \leq Mo+W/2+3(V+Nb/2+Ta/4) \leq 0.89\%$ $Mo \geq 0.15\%$ $V+Nb/2+Ta/4 \leq 0.004\%$ $Nb \leq 0.004\%$ $Cu \leq 0.45\%$ $Al \leq 0.1\%$ $Ti \leq 0.04\%$ $N \leq 0.0300\%$ the balance being iron and impurities resulting from the production operation, boron being an impurity whose content is less than 0.0005%, and P+S≤0.015%, the chemical composition complying with the condition:

$$410 \leq 540 \times C^{0.25} + 245[Mo+W/2+3(V+Nb/2+Ta/4)]^{0.30} \leq -460$$

the steel having a structure which is substantially martensitic or lower bainitic or which is substantially constituted by a mixture of these two structures, comprising at least 90% of martensite or lower bainite or a mixture of these two structures, a maximum of 5% of residual austenite, a maximum of 5% of ferrite, with a yield strength of between 480 MPa and 620 MPa and a Charpy toughness V, $K_{cv}$, greater than 50 J at −60° C.

Preferably, the chemical composition is such that one or more of the following conditions is complied with:

$Si \leq 0.19\%$ $Mn \leq 1\%$ $W \geq 0.11\%$ $2.5\% \leq Ni \leq 3.5\%$ $Cr \leq 0.2\%$ and preferably $Cr \leq 0.09\%$ $425 \leq 540 \times C^{0.25} + 245[Mo+W/2+3(V+Nb/2+Ta/4)]^{0.30} \leq 450$ $Ni \geq 2.7\%$ $Mo \leq 0.75\%$ $C \leq 0.055\%$ The invention also relates to a submarine hull component having a thickness of between 15 mm and 150 mm, of forged or rolled steel which has been quenched and tempered according to the invention and a submarine hull comprising components according to the invention which are assembled by means of welding.

The invention finally relates to the use of the steel according to the invention for producing a submarine hull comprising components which have thicknesses of between 15 mm and 150 mm and which are assembled by means of welding, the welding being able to be carried out on components which have not been pre-heated or which have been preheated to a temperature which does not exceed 25° C.

The invention will now be described in a more precise but non-limiting manner with reference to the single FIGURE which illustrates the path of the minimum temperature of non-cracking during welding as a function of the content of highly carbide-producing elements, and illustrated by means of examples.

The inventors found in a novel and unexpected manner that it was possible to produce, for submarine hulls which have features in accordance with the features generally required for producing submarines, components which can be more readily welded than components for submarines produced from known steel. To this end, it was necessary to use a steel whose composition had been modified compared with that of known steels, on the one hand, by substantially lowering the contents in terms of carbon and, on the other hand, by increasing the contents in terms of highly carbide-producing elements, that is to say, elements which are capable of precipitating in the form of fine and dispersed carbides which harden but do not embrittle, this steel having to have a structure which is substantially martensitic, that is to say, which comprises more than 90% of martensite, the balance being constituted by less than 5% of residual austenite and less than 5% of ferrite. However, it has been found that the martensite component may, without excessively impairing the toughness, be completely or partially replaced with bainite of the lower type, that is to say, bainite in the form of laths which in this respect have a micrographic appearance which is similar to martensite.

The chemical composition of the steel which has been modified in this manner comprises in % by weight:

more than 0.03% of carbon and preferably more than 0.035%, but less than 0.080% and preferably less than 0.060% and even more preferably less than 0.055%, in order to allow, on the one hand, the formation of hardening carbides during tempering but without impairing the toughness of the base metal and in particular the toughness in the heat affected zone during the welding operation; the content in terms of carbon being limited in particular in order to reduce the deformations linked to the martensitic transformation in the zone affected by the temperature in the welding zone, which is necessary in order to limit the effects of flanging and therefore reduce the susceptibility of the metal to cracking during the welding operation, from 0.04% to 0.48% of silicon in order to deoxidise the bath of liquid steel. Preferably, however, the silicon content will be reduced and will remain less than 0.29%, preferably less than 0.25% and, even more preferably, less than 0.19% so as to improve the thermal conductivity of the steel, which will have the effect of reducing the thermal gradients during the welding operation and thus reducing the resulting mechanical constraints, which reduces the susceptibility of the steel to cracking during the production of flanged weld seams, up to 1.4% of manganese in order to improve the quenchability but without forming excessively large segregated strips. Since the steel also contains other quenching elements, manganese is not strictly indispensable and the content thereof may be limited to 1.2%, and more preferably to 1.0%; it can also be present in trace levels. However, in order in particular to facilitate the production of the steel, the manganese content will preferably be at least equal to 0.2%, even 0.6%, at least 2.1% and more preferably 2.5% and even more preferably 2.7% of nickel in order to improve the quenchability, which is necessary in order to ensure that the desired type of microstructure is obtained, that is to say, a structure which is substantially constituted by martensite or lower bainite or a mixture of these two structures. The nickel content may be up to 5%, but in practice and taking into account the cost of this element, the content will preferably be less than 4% and even more preferably less than 3.5%, less than 0.3% and preferably less than 0.15% and even more preferably less than 0.09% of chromium. This carbide-producing element is not desirable. It is capable of forming relatively solid carbides which do not have a particularly advantageous effect on the properties of the steel according to the invention. Consequently, if it were too high a quantity, it would consume carbon which would then no longer be available to form hardening carbides with other highly carbide-producing elements which form hardening carbides which are fine and dispersed. Chromium is therefore considered to be a residue resulting from the production operation. Compliance with the limitation relating to the content of this element means that the steel has to be produced from raw materials which are selected with care. These precautions are important more particularly when the raw materials are constituted principally by scrap iron which is generally the case for this type of steel, highly carbide-producing elements which form precipitated carbides which are fine and hardening. These elements are molybdenum and tungsten, on the one hand, vanadium, niobium and tantalum, on the other hand. For these elements, the total by weight [Mo+W/2+3(V+Nb/2+Ta/4)] must be at least 0.30%, and preferably 0.35%, and even more preferably 0.4%. This total must not be too high in order to limit the unfavourable effects on the toughness and homogeneity of the metal, which would result from contents beyond that which is necessary for the desired hardening. Consequently, the total by weight of highly carbide-producing element remains less than 0.89%, and preferably less than 0.69%, and more preferably less than 0.59%. Furthermore, molybdenum and tungsten are preferable since vanadium, niobium and tantalum have a significant embrittling effect. Therefore, the total by weight V+Nb/2+Ta/4 remains less than 0.004%, and since niobium is more harmful to the toughness than vanadium, the content thereof is limited to 0.004% and the elements vanadium, niobium and tantalum are preferably present in trace levels. Conversely, the content in terms of molybdenum will be a minimum of 0.15% and more preferably 0.30% and even more preferably 0.45%. Molybdenum may be preferred to tungsten since it is more commonly used and is generally more economical than tungsten. However, tungsten has the advantage of reducing the formation of segregated zones which have unfavourable effects on the toughness of the metal, and it is thus still preferable to have a content of tungsten greater than 0.11%, less than 0.45%, and more preferably less than 0.25% of copper so as not to impair the forgeability and to promote the suitability of the sheets for subsequent shaping, up to 0.10% of aluminium and preferably less than 0.040%, but preferably more than 0.004%, and more preferably more than 0.010%, in order to deoxidise the steel and form aluminium nitrides which allow the growth of the grain to be controlled during the thermal processing operation, the content of nitrogen is preferably between 0.0010% and 0.0150% in order to facilitate the formation of aluminium nitrides which allow the growth of the grain to be controlled; the content in terms of nitrogen may exceed 0.0150%, but it is desirable for this content not to exceed 0.0300% and preferably not to exceed 0.0200% so as not to impair the suitability for shaping the products in a cold or tepid state, optionally up to 0.04% of titanium, an element which has a comparable effect to that of aluminium. However, since titanium has a tendency to form precipitates which have a very embrittling effect, it is preferable to limit the content of this element to trace levels.

The balance of the composition is constituted by iron and impurities resulting from the production operation. Amongst these impurities, boron must remain at trace levels, that is to say, at contents of less than 0.0005%. This is to prevent the embrittling effect of this element and its compounds in the form of nitrides and carbides. Although boron is an element which is commonly used in order to enhance the quenchability of steels having a high elastic limit, the very high level of impact resistance desired in this instance leads to the use of the contribution of boron being avoided. Also amongst the impurities, phosphorus and sulphur must be limited to contents such that the total P+S remains less than 0.015%, and preferably less than 0.012%, and even more preferably less than or equal to 0.009% in order not to impair the toughness of the steel. This restriction requires the steel to be produced with particularly strict precautions being taken. Nowadays, a person skilled in the art, who must comply with these restrictions, is aware of how to proceed.

Furthermore, in order to obtain adequate mechanical characteristics and in particular the yield strength and tensile strength, the chemical composition of the steel must be such that the quantity $$R=540\times C^{0.25}+245[Mo=W/2=3(V=Nb/2+Ta/4)]^{0.30}$$

is between 410 and 460 and preferably between 425 and 450.

In order to produce sheets or components which are intended for producing submarines, it is possible to proceed as indicated below.

First of all, the steel is produced in known manner, for example, in an electric oven, taking all the necessary precautions known to the person skilled in the art in order to comply with the purity restrictions of the steel indicated above, the steel is then poured in the form of bars or slabs depending on the type of components it is desirable to produce. The bars or slabs are then formed by means of plastic deformation in the hot state, that is to say, by means of rolling or forging, by reheating them to a temperature such that the beginning of the transformation at heat is carried out at a temperature greater than 1000° C., and preferably greater than 1050° C., and even more preferably greater than 1100° C., in order to limit surface defects. However, the reheating temperature must preferably remain less than 1260° C. and more preferably less than 1220° C., in order in particular to limit excessive growth of the grain at this stage. After the operation for shaping by means of plastic deformation in the hot state, the components produced are subjected to a thermal processing operation relating to the quality comprising a quenching operation either starting from the forming heat or preferably, after reaustenitisation at a temperature which is at least equal to AC3 and generally between approximately 860 and 950° C. The cooling can be achieved in accordance with all known quenching means, such as those using air, oil or water, in accordance with the solidity of the components in question in order to obtain a substantially martensitic microstructure after quenching. The person skilled in the art knows how to select, on a case by case basis, the most suitable quenching means.

The quenching is followed by at least one tempering operation which is preferably carried out at a temperature of between 550° C. and 670° C.

Using this method, it is possible to obtain sheets or forged components whose mechanical characteristics over the entire thickness are in accordance with that desired for the production of submarines, that is to say, a yield strength of between 480 MPa and 620 MPa and preferably between 500 MPA and 600 MPa, and a Charpy toughness $K_{cv}$ greater than 50 J at −60° C.

The effect of the chemical composition on the suitability for welding is illustrated by the examples whose analyses are set out in tables 1 and 2. For the examples of the tables, niobium, tantalum and titanium are at trace levels so that the values of Mo+W/2+3V indicated in the table are equal to the quantities Mo+3(V+Nb/2+Ta/4); boron is at trace levels with a content of less than 0.0005%; aluminium is between 0.015% and 0.025%. In table 1, the total P+S is expressed in $10^{-3}$%. In table 2, the total P+S remains less than 0.015%.

Examples 1 and 2 are in accordance with the prior art and examples 3 to 9 and 6a to 9a are in accordance with the invention. Example 10 is given by way of comparison.

TABLE 1

| n° | C | Si | Mn | Ni | Cr | Mo |
|---|---|---|---|---|---|---|
| 1 | 0.092 | 0.300 | 0.550 | 3.000 | 0.060 | 0.270 |
| 2 | 0.083 | 0.400 | 0.800 | 3.000 | 0.070 | 0.160 |
| 3 | 0.069 | 0.320 | 0.900 | 3.200 | 0.080 | 0.320 |
| 4 | 0.062 | 0.350 | 0.920 | 3.100 | 0.090 | 0.320 |
| 5 | 0.055 | 0.320 | 0.510 | 3.250 | 0.130 | 0.210 |
| 6 | 0.049 | 0.280 | 0.920 | 3.300 | 0.095 | 0.395 |
| 7 | 0.043 | 0.300 | 0.580 | 2.950 | 0.085 | 0.470 |
| 8 | 0.035 | 0.290 | 0.980 | 3.100 | 0.095 | 0.590 |
| 9 | 0.030 | 0.320 | 1.010 | 2.950 | 0.120 | 0.555 |

TABLE 1-continued

| | | | | | | | |
|---|---|---|---|---|---|---|---|
| 10 | | 0.023 | 0.300 | 0.960 | 3.150 | 0.090 | 1.015 |

| n° | W | V | Cu | P + S | (Mo + W/2) + 3 V | Re Mpa | Kv-85° C. (J) |
|---|---|---|---|---|---|---|---|
| 1 | tr | 0.003 | 0.250 | 9 | 0.279 | 575 | 205 |
| 2 | 0.115 | 0.024 | 0.150 | 8 | 0.291 | 570 | 135 |
| 3 | tr | 0.003 | 0.150 | 11 | 0.329 | 565 | 210 |
| 4 | tr | 0.001 | 0.180 | 9 | 0.323 | 545 | 230 |
| 5 | 0.240 | 0.002 | 0.250 | 7 | 0.336 | 560 | 225 |
| 6 | tr | 0.003 | 0.160 | 8 | 0.404 | 570 | 260 |
| 7 | tr | 0.001 | 0.180 | 7 | 0.473 | 570 | 260 |
| 8 | tr | 0.002 | 0.200 | 9 | 0.596 | 565 | 275 |
| 9 | 0.360 | 0.003 | 0.210 | 6 | 0.744 | 570 | 280 |
| 10 | tr | 0.002 | 0.210 | 8 | 1.021 | 570 | 295 |

TABLE 2

| n° | C | Si | Mn | Ni | Cr | Mo | W | V | Cu | (Mo + W/2) + 3 V | Re MPa | Kv-85° C. (J) |
|---|---|---|---|---|---|---|---|---|---|---|---|---|
| 6a | 0.050 | 0.120 | 0.920 | 3.300 | 0.095 | 0.400 | tr | 0.003 | 0.160 | 0.409 | 570 | 250 |
| 7a | 0.044 | 0.110 | 0.560 | 3.000 | 0.080 | 0.465 | tr | 0.002 | 0.210 | 0.471 | 580 | 275 |
| 8a | 0.036 | 0.120 | 0.980 | 3.250 | 0.095 | 0.600 | tr | 0.004 | 0.220 | 0.612 | 575 | 260 |
| 9a | 0.030 | 0.130 | 1.100 | 3.100 | 0.110 | 0.720 | tr | 0.003 | 0.200 | 0.729 | 570 | 280 |

Examples 1 to 9 illustrate the combined effect of the content in terms of carbon and the highly carbide-producing elements for conventional contents of silicon. Examples 6a, 7a, 8a and 9a illustrate the particular effect of silicon.

The effect on the weldability can be evaluated in particular using a test by means of which the minimum preheating temperature is determined for the auto-flange weld joint for which cracking is not seen to appear after welding. This test involves producing weld seams with preheating temperatures of 150°, 125°, 100°, 75°, 50°, 25°, 5° and observing the joints obtained in order to detect the presence or absence of cracks.

The results of this evaluation, which correspond to the examples of tables 1 and 2, are illustrated in the single FIGURE in which a first lines 1 can be seen which represents the path of the minimum non-cracking temperature as a function of the content of highly carbide-producing elements for a silicon content in the order of 0.3%.

On this lines, it is found that, when the content of highly carbide-producing elements increases and the content in terms of carbon decreases at the same time, up to a content of highly carbide-producing elements in the order of 0.6%, the minimum non-cracking temperature decreases. Beyond approximately 0.6%, the minimum non-cracking temperature begins to increase again. Using micrographic examination in the region of the cracks of the castings 9 and 10 which correspond to the highest contents in terms of highly carbide-producing elements, it can be established that the cracks appear in segregated zones whose hardness is found to be particularly high in spite of a relatively low carbon content. This high level of hardness of the segregated zones probably results from a co-segregation of the carbon and the highly carbide-producing elements.

Upon examination of this line, it appears that an optimum level of weldability is obtained for contents of highly carbide-producing elements of between approximately 0.4% and 0.65%.

Line 2, which corresponds to steels having compositions which are comparable but which have a much lower silicon content than in the example above, indicates that, when the content in terms of silicon is reduced, the minimum non-cracking temperature is reduced by 20° C. to 25° C.

This effect of the silicon can be attributed to the effect of the silicon on the thermal conductivity. By reducing the level of silicon which significantly impairs the thermal conductivity of the steel, the temperature gradients are reduced in the heat affected zone, which has the effect of reducing the levels of stress.

This can be confirmed by measurements of the thermal conductivity of the castings 6a to 9a and 6 to 9 which are comparable therewith. Measurements of this type would show that the thermal conductivity of the castings 6a and 9a is greater than that of the castings 6 to 9 by approximately 10%.

With the steel according to the invention, it is possible to produce components for submarine hulls, for example, components which are cut from sheets having a thickness of between 40 and 60 mm, or forged components such as connection components whose great thicknesses can be up to 100 to 150 mm.

Using these components whose characteristics have been indicated above, it is possible to produce submarine hulls by assembling these components by means of welding on open air sites, the outside temperature being able to reach 0° C. These components can be welded in a satisfactory manner with no pre-heating, or with preheating to less than 25° C.

When the "coated electrode" method is used, which is generally recommended for the welding operations considered in this instance, the precautions for use which are intended to limit the content of hydrogen introduced must be complied with to the greatest possible extent, that is to say, storage in the dry state and prior baking of the electrodes. The type of electrode used may correspond, for example, to the type E55 2NiMo in accordance with the standard EN757.

The solid wire MIG method which naturally introduces practically no hydrogen, is to be preferred wherever possible using, for example, a wire of the type G55 Mn4Ni2Mo in accordance with the standard EN 12534.

These indications relating to the welding method constitute non-limiting recommended values in this instance.

The invention claimed is:

1. A process of producing a submarine hull, comprising
   (a) providing steel components, said steel components having thicknesses of between 15 mm and 150 mm,
   said steel components having a chemical composition consisting of, in weight percent:

$0.030\% \leq C \leq 0.080\%$ $0.040\% \leq Si \leq 0.19\%$ $0.1\% \leq Mn \leq 1.4\%$ $2\% \leq Ni \leq 4\%$ $Cr \leq 0.3\%$ $0.30\% \leq Mo+W/2+3(V+Nb/2+Ta/4) \leq 0.89\%$ $0.15\% \leq Mo \leq 0.89\%$ $W \leq 1.48\%$ $V+Nb/2+Ta/4 \leq 0.004\%$ $Nb \leq 0.004\%$ $Cu \leq 0.45\%$ $Al \leq 0.1\%$ $Ti \leq 0.04\%$ $N \leq 0.0300\%$ impurities resulting from the production operation, said impurities including $B \leq 0.0005\%$, $P+S \leq 0.015\%$, the balance being iron,
the chemical composition complying with the condition:

$410 \leq 540 \times C^{0.25} + 245[Mo+W/2+3(V+Nb/2+Ta/4)]^{0.030} \leq 460$ the steel components having a structure comprising:
 at least 90% of martensite,
 a maximum of 5% of residual austenite, and
 a maximum of 5% of ferrite,
the steel components having an elastic limit of between 480 MPa and 620 MPa
(b) assembling and welding said steel components together to manufacture said submarine hull,
 wherein the steel components are welded by arc welding using a coated electrode welding process or by arc welding using a solid wire MIG welding process,
 wherein the welding is started without preheating, including when the welding is carried out when ambient temperature is less than 0° C., and the welding of said steel components comprises using filler metal.

2. The process according to claim 1, wherein:

$0.1\% \leq Mn \leq 1\%$.

3. The process according to claim 1, wherein:

$0.11\% \leq W \leq 1.48\%$.

4. The process according to claim 1, wherein:

$2.5\% \leq Ni \leq 3.5\%$.

5. The process according to claim 1, wherein:

$Cr \leq 0.15\%$.

6. The process according to claim 5, wherein:

$Cr \leq 0.09\%$.

7. The process according to claim 1, wherein:

$425 \leq 540 \times c^{0.25} + 245[Mo+W/2+3(V+Nb/2+Ta/4)]^{0.30} \leq 450$.

8. The process according to claim 1, wherein:

$4\% \geq Ni \geq 2.7\%$.

9. The process according to claim 1, wherein:

$0.15\% \leq Mo \leq 0.75\%$.

10. The process according to claim 1, wherein:

$0.030\% \leq C \leq 0.055\%$.

11. The process according to claim 1, wherein:

$0.030\% \leq C < 0.060\%$ $0.040\% \leq Si < 0.19\%$ $0.6\% \leq Mn < 1.2\%$ $2.5\% \leq Ni < 3.5\%$ $Cr < 0.15\%$ $0.40\% \leq Mo+W/2+3(V+Nb/2+Ta/4) < 0.59\%$ $0.15\% \leq Mo \leq 0.89\%$ $V+Nb/2+Ta/4 \leq 0.004\%$ $Nb \leq 0.004\%$ $Cu < 0.25\%$ $Al < 0.04\%$ titanium being absent or present in trace levels.

* * * * *